United States Patent [19]

Feldman et al.

[11] 4,273,701

[45] Jun. 16, 1981

[54] COLORANT-THICKENER DISPERSIONS FOR UNSATURATED POLYESTER RESIN COMPOSITIONS

[75] Inventors: Martin L. Feldman, East Brunswick; James T. De Groff, Oldwick, both of N.J.

[73] Assignee: Tenneco Chemicals, Inc., Saddle Brook, N.J.

[21] Appl. No.: 119,718

[22] Filed: Feb. 8, 1980

Related U.S. Application Data

[62] Division of Ser. No. 44,724, Jun. 1, 1979.

[51] Int. Cl.$^3$ .............................................. C08L 67/00
[52] U.S. Cl. .................................... 260/40 R; 525/19; 525/444; 525/445; 525/447; 525/448
[58] Field of Search .............. 260/40 R; 525/19, 444, 525/445, 447, 448

[56] References Cited

U.S. PATENT DOCUMENTS

| 2,568,331 | 9/1951 | Frilette | 525/19 |
|---|---|---|---|
| 3,795,717 | 3/1974 | Vargiu et al. | 525/19 |
| 3,926,898 | 12/1975 | Choi et al. | 260/40 R |
| 4,189,452 | 2/1980 | Haddad et al. | 525/444 |

Primary Examiner—J. Ziegler
Attorney, Agent, or Firm—Evelyn Berlow

[57] ABSTRACT

An unsaturated polyester resin composition comprises an unsaturated polyester resin, an unsaturated monomer capable of reacting with the unsaturated polyester to form cross-linkages, and a colorant-thickener dispersion that comprises (a) 20% to 50% by weight of a thickener comprising a Group II-A metal oxide or hydroxide, 5% to 20% by weight of a pigment component, and 30% to 75% by weight of an unsaturated polyester vehicle that comprises 80% to 98% by weight of at least one unsaturated polyester that is the product of the reaction of a dicarboxylic acid component containing 80 to 90 mole % of at least one unsaturated aliphatic dicarboxylic acid having 4 to 8 carbon atoms and 10 to 20 mole % of at least one saturated aromatic dicarboxylic acid with an alcohol component containing 40 to 60 mole % of at least one glycol having 2 to 6 carbon atoms and 40 to 60 mole % of at least one monohydric alcohol having 6 to 12 carbon atoms, in the amount of 0.4 mole to 0.6 mole of the dicarboxylic acid component per mole of the alcohol component, and 2% to 20% by weight of an unsaturated monomer capable of reacting with said unsaturated polyester to form cross-linkages.

9 Claims, No Drawings

COLORANT-THICKENER DISPERSIONS FOR UNSATURATED POLYESTER RESIN COMPOSITIONS

This is a division of our copending application Ser. No. 44,724, which was filed on June 1, 1979.

This invention relates to colorant-thickener dispersions for unsaturated polyester resin compositions and to unsaturated polyester resin compositions that contain these dispersions. It further relates to processes for the preparation of the colorant-thickener dispersions and the unsaturated polyester resin compositions that contain these dispersions.

Polyester resin compositions that have been rendered insoluble and infusible by cross-linking are commercially important types of polymeric materials that are widely used in casting, laminating, filament winding, and other applications in which the resin is cured in place. The cross-linked polyester resin systems are used, for example, in the manufacture of fiber-reinforced compositions in which glass or other fibers are embedded in a matrix of the resin. The resulting sheet molding compounds (SMC) and bulk molding compounds (BMC) are being used with increasing frequency in compression molding operations. SMC technology always employs chemical thickening of the resin matrix during formulation; BMC technology often employs this technique.

Chemical thickening involves the interaction of residual carboxyl and/or hydroxyl groups on the linear chains of the polyester resin with alkaline earth metal oxides and hydroxides to increase the viscosity of the uncrosslinked resin during maturation after compound preparation. Typical SMC molding viscosities range from 10–60,000,000 cps., depending upon the application. The purpose of the chemical thickening agent is to provide a tack-free SMC sheet stiff enough to permit easy handling and to provide sufficient resin viscosity to carry glass fibers to the extremities of the mold during crosslinking of the system. Low viscosity compounds can result in resin washing and poor carry of reinforcing fibers, particularly in large molded parts.

The alkaline earth metal oxides and hydroxides that are used as chemical thickeners can be added to the polyester resin compositions as dry powders or as dispersions in resinous vehicles. The use of dispersions is generally preferred because they protect the thickener from moisture and carbon dioxide, they are non-dusting, and they are easy to handle. Thickener dispersions that have been widely used heretofore have been made by dispersing the metal oxide or hydroxide in curable polyesters that have acid values of about 20. Because these polyesters undergo a reaction with the metal oxides and hydroxides that results in the thickening of the dispersions, the amount of the thickener that can be used in the dispersions is limited to that which will produce a handleable dispersions. For example, a dispersion of 40% by weight of magnesium oxide in a conventional polyester resin may be difficult to handle because it has a putty-like consistency.

In many applications in which polyester resin compositions are used, it has become important to provide a means for coloring the SMC and BMC formulations so as to enhance their appearance. This is ordinarily accomplished by adding a dispersion of pigment in a compatible, curable polyester vehicle to the mixture of polyester resin, chemical thickener, catalyst, filler, and other reactants prior to the addition of reinforcing fiber on the BMC/SMC machine.

The liquid pigment dispersions that have been used heretofore to color unsaturated polyester resin compositions usually contain a surfactant to assist in the dispersion of the pigment in the polyester resin, an organic solvent, and/or a resinous vehicle. The presence of a surfactant or an organic solvent in the liquid pigment dispersion may have an adverse effect on the physical and mechanical properties of the colored BMC or SMC product, and the presence of an organic solvent in the dispersion tends to cause pollution problems. The previously-used pigment dispersions often contained polyester vehicles that were unstable and that had a deleterious effect on the properties of the finished products.

In accordance with this invention, it has been found that stable, non-thickening fluid dispersions that contain as much as 50% by weight of a chemical thickener and 20% by weight of a pigment component can be prepared by dispersing an alkaline earth metal oxide or hydroxide and a pigment component in a low-viscosity polyester vehicle that has a very low acid value and excellent pigment wetting properties. These colorant-thickener dispersions are characterized by excellent stability, low viscosity, and compatibility with all types of polyester resin. These dispersions, which can be poured, pumped, and metered, can be readily and uniformly incorporated into SMC and BMC formulations. Because they contain a non-thickening, low-viscosity polyester vehicle, the dispersions have good flow characteristics even at relatively high pigment and thickener loadings. When used in the amounts required to color and thicken unsaturated polyester resin compositions, the dispersions have little or no effect on the physical and mechanical properties of the cured compositions. In addition, the dispersions contain no volatile materials that can cause pollution problems. The use of the colorant-thickener dispersions of this invention in long production runs of polyester resin compositions of a single color is particularly advantageous because it insures a consistent colorant-to-thickener ratio through the run. In addition, less material handling is necessary and a more uniform product is obtained when the novel colorant-thickener dispersions are used than when the previously-known methods of coloring and thickening SMC, BMC, and other polyester resin compositions are employed.

The amounts of the pigment component and the thickener in the dispersions can be varied over wide ranges and are determined by the requirements of the polyester compositions that are being produced. The colorant-thickener dispersions generally contain 20% to 50% by weight of a chemical thickener, 5% to 20% by weight of a pigment component, and 30% to 75% by weight of a low-viscosity, curable, unsaturated polyester vehicle. They preferably contain 30% to 40% by weight of the thickener, 5% to 10% by weight of the pigment component, and 50% to 65% by weight of the polyester vehicle.

The unsaturated polyester vehicles in which the thickener and pigment component are dispersed comprise 50% to 100% by weight of an unsaturated polyester prepared by the reaction of a dicarboxylic acid component that contains an unsaturated aliphatic dicarboxylic acid and a saturated aromatic dicarboxylic acid and an alcohol component that contains a glycol and a monohydric alcohol and 0 to 50% by weight of an unsaturated monomer that is capable of reacting with the unsaturated polyester to form cross-linkages. They preferably contain 80% to 98% by weight of the unsaturated polyester and 2% to 20% by weight of the unsaturated monomer.

The unsaturated polyesters that are components of the curable polyester vehicles are prepared by the reaction of a dicarboxylic acid component with an alcohol component in the amounts of 0.4 mole to 0.6 mole of the dicarboxylic acid component per mole of the alcohol component. In order to obtain unsaturated polyesters having excellent stability, low viscosity, and other desired characteristics, the dicarboxylic acid component must contain from 80 to 90 mole % of at least one unsaturated dicarboxylic acid having 4 to 8 carbon atoms and 10 to 20 mole % of at least one saturated aromatic dicarboxylic acid, preferably 83 to 87 mole % of an unsaturated aliphatic acid and 13 to 17 mole % of a saturated aromatic acid. Illustrative of the unsaturated aliphatic dicarboxylic acids that can be used in the preparation of the unsaturated polyesters are maleic, fumaric, chloromaleic, ethylmaleic, dimethylmaleic, glutaconic, itaconic, mesaconic, citraconic, acetylenedicarboxylic acids, and mixtures thereof, as well as the anhydrides, acid halides, and lower alkyl esters of these acids. Suitable aromatic acids include phthalic, isophthalic, terephthalic, tetrachlorophthalic, tetrabromophthalic, dibromotetrahydrophthalic acids, and mixtures thereof, and the corresponding anhydrides, acid halides, and lower alkyl esters. The dicarboxylic acid component preferably contains fumaric acid and isophthalic acid. The alcohol component of the unsaturated polyesters must contain 40 to 60 mole % of at least one glycol having 2 to 6 carbon atoms and 40 to 60 mole % of at least one monohydric alcohol having 6 to 10 carbon atoms. It preferably contains equimolar amounts of the mono- and dihydric alcohols. Examples of the useful glycols are ethylene glycol, diethylene glycol, propylene glycol, dipropylene glycol, butanediol, hexanediol, neopentyl glycol, and dibromoneopentyl glycol. The monohydric alcohol may be, for example, n-hexanol, 2-methyl-pentanol-1, 2-ethylbutanol-1, neopentyl carbinol, n-haptanol, n-octanol, 2-ethylhexanol, decanol, or dodecanol. The alcohol component preferably contains ethylene glycol and 2-ethylhexanol.

The unsaturated polyesters are prepared by the conventional procedure, that is, by reacting the dicarboxylic acid component with the alcohol component at a temperature in the range of 130° C. to 220° C. in the presence of an esterification catalyst, such as p-toluenesulfonic acid or benzenesulfonic acid, and in an atmosphere of inert gas, such as nitrogen or carbon dioxide, until the desired unsaturated polyester is obtained. These polyesters usually have acid values of 0.1 to 5 and hydroxyl values of 100 to 160; they preferably have acid values of 0.5 to 4 and hydroxyl values of 120 to 135.

The unsaturated monomers that may be present in the unsaturated polyester vehicles are those that are conventionally used to form cross linkages by reacting with the polyesters through their unsaturated acid components. They include styrene, methylstyrene, dimethylstyrene, divinylbenzene, vinyltoluene, dichlorostyrene, methyl acrylate, ethyl acrylate, methyl methacrylate, diallyl phthalate, triallyl cyanurate, trimethylolpropane diallyl ether, neopentyl glycol diacrylate, vinyl acetate, acrylonitrile, acrylamide, and mixtures thereof. The chemical thickeners that may be present in the colorant-thickener dispersions of this invention are the oxides and hydroxides of the metals of Group II-A of the Periodic Table of Elements, that is, the oxides and hydroxides of magnesium, calcium, strontium, and barium. For reasons of efficiency and economy, magnesium oxide, magnesium hydroxide, calcium oxide, calcium hydroxide, and mixtures thereof are the preferred thickeners.

The pigment component of the colorant-thickeners may contain an inorganic pigment, such as carbon black, titanium dioxide, iron oxide, aluminum oxide, antimony oxide, cuprous oxide, chromium oxides, cadmium sulfides, cadmium selenides, lead chromate, lead titanate, zirconium oxide, or a mixture thereof, or it may contain an organic pigment, such as azo, anthraquinone, benzidene, dianisidine, phthalocyanine, quinacridone, dioxazine, or isoindolinone pigments or a mixture thereof. It may also contain an extender pigment such as clay, calcium carbonate, talc, bentonite, kaolin, mica, silica, barium sulfate, or barium carbonate.

The colorant-thickener dispersions may be prepared by any suitable and convenient procedure. For example, they may be prepared by grinding a mixture that comprises the thickener, the pigment component, and the unsaturated polyester in a ball mill, sand mill, dispersion mill, colloid mill, or high shear mixer until a uniform dispersion is obtained. Alternatively, the thickener may be added to a dispersion of the pigment component in the polyester vehicle or the pigment component may be added to a dispersion of the thickener in the polyester vehicle, and the resulting mixture ground until a uniform dispersion is obtained. The colorant-thickener dispersions are preferably prepared by mixing the appropriate amounts of a dispersion that contains 25% to 70% by weight of the thickener and 30% to 75% by weight of the polyester vehicle with a dispersion that contains 10% to 70% by weight of a pigment component and 30% to 90% by weight of the polyester vehicle until a uniform dispersion is obtained. The polyester vehicle in which the thickener is dispersed may be the same as that in which the pigment component is dispersed, or it may be a different one. Particularly good results have been obtained by combining a dispersion of a thickener in a polyester vehicle that consisted essentially of an unsaturated polyester with a dispersion of a pigment component in a polyester vehicle that contained 80% to 98% by weight of an unsaturated polyester and 2% to 20% by weight of an unsaturated monomer.

In addition to the thickener, pigment component, and polyester vehicle, the dispersions of this invention may contain viscosity modifiers, such as isopropyl triisostearoyl titanate, isopropyl trimethacryl titanate, and zinc naphthanate; acid neutralizers, such as dimethylaminoethanol and other amines; and other conventional additives.

The unsaturated polyester resin compositions into which the colorant-thickener dispersions of this invention are incorporated include sheet molding compounds (SMC) and bulk molding compounds (BMC) that comprise an unsaturated polyester resin and an unsaturated monomer capable of reacting with the polyester to form cross-linkages.

The unsaturated polyesters that are used in the production of these polyester resin compositions are formed by condensing a saturated dicarboxylic acid or anhydride and an unsaturated dicarboxylic acid or anhydride with a dihydric alcohol. Illustrative of these polyester resins are the products of the reaction of a saturated dicarboxylic acid or anhydride, such as phthalic anhydride, isophthalic acid, tetrahydrophthalic anhydride, hexahydrophthalic anhydride, endomethylene tetrahydrophthalic anhydride, tetrachlorophthalic anhydride, hexachloroendomethylene tetrahydrophthalic acid, succinic acid, glutaric acid, adipic acid, pimelic acid, suberic acid, azelaic acid, and sebacic acid, and an unsaturated dicarboxylic acid or anhydride, such as maleic anhydride, fumaric acid, chloromaleic acid, itaconic acid, citraconic acid, and mesaconic acid, with a dihydric alcohol, such as ethylene glycol, propylene glycol, butylene glycol, diethylene, glycol, triethylene glycol, and neopentyl glycol. Small amounts of a polyhydric alcohol, such as glycerol, pentaerythritol, trimethylolpropane, or sorbitol, may be used in combination with the glycol.

A three-dimensional structure is produced by reacting the unsaturated polyester with an unsaturated monomer, such as styrene, methylstyrene, dimethylstyrene, vinyltoluene, divinylbenzene, dichlorostyrene, methyl acrylate, ethyl acrylate, methyl methacrylate, diallyl phthalate, vinyl acetate, triallyl cyanurate, acrylonitrile, acrylamide, and mixtures thereof. The unsaturated polyester resin compositions generally contain 20% to 80% by weight of the monomer, with the monomer content preferably in the range of 30% to 70% by weight.

The amount of the colorant-thickener dispersions that is incorporated into the unsaturated polyester resin compositions is that which will result in the formation of tack-free, high viscosity molding compounds having the desired coloration. In most cases, 1 part to 50 parts by weight, preferably 3 parts to 15 parts by weight, of the colorant-thickener dispersion is used per 100 parts by weight of the unsaturated polyester resin composition.

In addition to the unsaturated polyester resin, the cross-linking monomer, and colorant-thickener dispersion, the unsaturated polyester resin compositions of this invention may contain free-radical polymerization catalysts, accelerators, inhibitors, stabilizers, plasticizers, flame-retardants, mold release agents, reinforcing fibers, inert fillers, and the like in the amounts ordinarily used for these purposes.

The invention is further illustrated by the following examples. In these examples, all parts are parts by weight and all percentages are percentages by weight.

EXAMPLE 1

A. A reaction mixture that contained 1.000 mole of 2-ethylhexanol, 1.152 moles of ethylene glycol, 0.894 mole of fumaric acid, 0.150 mole of isophthalic acid, and a catalytic amount of p-toluenesulfonic acid was heated at a temperature in the range of 130° to 220° C. in an atmosphere of nitrogen to form an unsaturated polyester that had an acid value of 1.5 and a hydroxyl value of 115.

B. To 750 parts of the unsaturated vehicle were added 3.75 parts of isopropyl triisostearoyl titanate (TTS Titanate), 2.5 parts of dimethylaminoethanol, and 750 parts of magnesium oxide (Maglite D). The mixture was agitated vigorously until a uniform, lump-free thickener dispersion was obtained.

C. A reaction mixture that contained 1.00 mole of ethylene glycol, 1.01 mole of 2-ethylhexanol, 0.91 mole of fumaric acid, 0.15 mole of isophthalic acid, and a catalytic amount of p-toluenesulfonic acid was heated at a temperature in the range of 130° to 220° C. in an atmosphere of nitrogen to form an unsaturated polyester that had an acid value of 1.9, a hydroxyl value of 110, and a viscosity of 229 cps. Subsequently, 86.3 parts of this unsaturated polyester was mixed with 13.7 parts of trimethylolpropane diallyl ether to form an unsaturated polyester vehicle.

D. A pigment dispersion was prepared by sand milling a mixture containing 80 parts of the unsaturated polyester vehicle of Example 1-C and 20 parts of carbon black (Regal 99) until a uniform pigment dispersion was obtained.

E. A colorant-thickener dispersion was prepared by mixing 364 parts of the thickener dispersion of Example 1-B with 182 parts of the pigment dispersion of Example 1-D and subjecting the mixture to high speed agitation until a uniform dispersion was obtained. This colorant-thickener dispersion, which contained 33% of magnesium oxide and 6.7% of carbon black, was a smooth, free-flowing paste.

F. One hundred parts of a commercially-available reactive polyester resin (Hatco Polyester G-R 13031) was mixed thoroughly with 3 parts of the colorant-thickener dispersion of Example 1-E, and the mixture was placed in an oven at 70° C. After 6 hours' heating, a tack-free, uniformly-colored resinous product was obtained.

EXAMPLE 2

A. Two hundred parts of the unsaturated polyester whose preparation is described in Example 1-A was agitated vigorously while 100 parts of magnesium oxide (Maglite D) was added to it. The agitation was continued until a uniform, lump-free thickener that contained 33% MgO was obtained.

B. A pigment dispersion was prepared by sand milling a mixture containing 41 parts of the unsaturated polyester of Example 1-C and 59 parts of chrome oxide green until a uniform dispersion was obtained.

C. A colorant-thickener dispersion was prepared by mixing 300 parts of the thickener dispersion of Example 2-A with 50 parts of the pigment dispersion of Example 2-B and subjecting the mixture to high speed agitation until a uniform dispersion was obtained. This dispersion, which contained 30% of magnesium oxide and 8.6% of chrome oxide green, was a smooth, free-flowing paste.

D. Two parts of the colorant-thickener dispersion was mixed thoroughly into 100 parts of a commercially-available polyester resin (Hatco Polyester G-R 13031). The mixture was placed in an oven at 70° C. After 6 hours' heating, a tack-free, uniformly-colored resinous product was obtained.

Each of the other thickeners and pigments disclosed herein can be used in a similar manner in the preparation of the colorant-thickener dispersions and the unsaturated polyester resin compositions of this invention.

What is claimed is:

1. An unsaturated polyester resin composition that comprises
   (a) an unsaturated polyester resin formed by condensing a saturated dicarboxylic acid and an unsaturated dicarboxylic acid with a dihydric alcohol,
   (b) an unsaturated monomer capable of reacting with the unsaturated polyester to form cross-linkages, and
   (c) a colorant-thickener dispersion that comprises
      (1) 20% to 50% by weight of a thickener comprising a Group II-A metal oxide or hydroxide,
      (2) 5% to 20% by weight of a pigment component, and (3) 30% to 75% by weight of an unsaturated polyester vehicle that comprises
  ((a)) 80% to 98% by weight of an unsaturated polyester that is the product of the reaction of a dicarboxylic acid component containing 80 to 90 mole % of at least one unsaturated aliphatic dicarboxylic acid having 4 to 8 carbon atoms and 10 to 20 mole % of at least one saturated aromatic dicarboxylic acid with an alcohol component containing 40 to 60 mole % of at least one glycol having 2 to 6 carbon atoms and 40 to 60 mole % of at least one monohydric alcohol having 6 to 12 carbon atoms, in the amount of 0.4 mole to 0.6 mole of the dicarboxylic acid component per mole of the alcohol component, and
  ((b)) 2% to 20% by weight of an unsaturated monomer capable of reacting with said unsaturated polyester to form cross-linkages.

2. An unsaturated polyester resin composition as defined in claim 1 wherein the colorant-thickener dispersion comprises
  (a) 30% to 40% by weight of said thickener,
  (b) 5% to 10% by weight of said pigment component, and
  (c) 50% to 65% by weight of said unsaturated polyester vehicle.

3. An unsaturated polyester resin composition as defined in claim 1 wherein the thickener is magnesium oxide.

4. An unsaturated polyester resin composition as defined in claim 1 wherein the unsaturated polyester vehicle in the colorant-thickener dispersion contains an unsaturated polyester that is the product of the reaction of a dicarboxylic acid component containing 83 to 87 mole % of fumaric acid and 13 to 17 mole % of isophthalic acid with an alcohol component containing equimolar amounts of ethylene glycol and 2-ethylhexanol.

5. In the process for preparing a colored polyester molding composition that comprises mixing an unsaturated polyester with an unsaturated monomer that is capable of reacting with said unsaturated polyester to form cross-linkages, a pigment component, and a thickening agent, the improvement wherein the pigment component and thickener are added as a colorant-thickener dispersion that comprises
  (a) 20% to 50% by weight of a thickener comprising a Group II-A metal oxide or hydroxide,
  (b) 5% to 20% by weight of a pigment component, and
  (c) 30% to 75% of an unsaturated polyester vehicle that comprises
    (1) 80% to 98% by weight of at least one unsaturated polyester that is the product of the reaction of a dicarboxylic acid component containing 80 to 90 mole % of at least one unsaturated aliphatic dicarboxylic acid having 4 to 8 carbon atoms and 10 to 20 mole % of at least one saturated aromatic dicarboxylic acid with an alcohol component containing 40 to 60 mole % of at least one glycol having 2 to 6 carbon atoms and 40 to 60 mole % of at least one monohydric alcohol having 6 to 12 carbon atoms, in the amount of 0.4 mole to 0.6 mole of the dicarboxylic acid component per mole of the alcohol component, and
    (2) 2% to 20% by weight of an unsaturated monomer capable of reacting with said unsaturated polyester to form cross-linkages.

6. The process of claim 5 wherein the colorant-thickener dispersion contains
  (a) 30% to 40% by weight of said thickener,
  (b) 5% to 10% by weight of said pigment component, and
  (c) 50% to 65% by weight of said unsaturated polyester vehicle.

7. The process of claim 5 wherein the unsaturated polyester vehicle in the colorant-thickener dispersion contains an unsaturated polyester that is the product of the reaction of a dicarboxylic acid component containing 83 to 87 mole % of fumaric acid and 13 to 17 mole % of isophthalic acid with an alcohol component containing equimolar amounts of ethylene glycol and 2-ethylhexanol.

8. The process of claim 5 wherein the thickener is magnesium oxide.

9. The process of claim 5 wherein the pigment component consists essentially of carbon black.

* * * * *